United States Patent [19]

Robertson et al.

[11] Patent Number: 5,156,354

[45] Date of Patent: Oct. 20, 1992

[54] WEB-ROLL ANTI-CLOCKSPRINGING MECHANISM

[75] Inventors: Jeffrey C. Robertson, Rochester; Bruce J. Semmler, Spencerport, both of N.Y.

[73] Assignee: Eastman Kodak Company, Rochester, N.Y.

[21] Appl. No.: 579,762

[22] Filed: Sep. 10, 1990

[51] Int. Cl.⁵ .............................................. G03B 1/00
[52] U.S. Cl. ................................. 242/71.1; 242/55.53
[58] Field of Search ................ 242/71.1, 71.7, 71.8, 242/71, 55.53, 194, 197; 352/72, 75, 78 R; 359/275, 277; 206/408, 409; 70/379 R, 380

[56] References Cited

U.S. PATENT DOCUMENTS

| | | | |
|---|---|---|---|
| 1,515,611 | 11/1924 | O'Connor | 20/379 R |
| 2,129,967 | 9/1938 | Rubner | 70/379 R |
| 2,423,982 | 7/1947 | Kaufman | 70/379 R |
| 3,599,894 | 8/1971 | Edwards | 242/194 |
| 3,613,876 | 10/1971 | Kohler et al. | |
| 3,622,101 | 11/1971 | Sutliff et al. | 242/194 |
| 3,705,763 | 12/1972 | Almstead | 242/194 X |
| 3,784,001 | 1/1974 | Bushnell et al. | |
| 3,794,269 | 2/1974 | Hoover | 242/194 |
| 3,831,881 | 8/1974 | Tucker | 242/194 |
| 3,858,968 | 1/1975 | Miller et al. | 242/194 X |
| 3,860,195 | 1/1975 | Holzhauser et al. | 242/194 |
| 3,920,196 | 11/1975 | Tucker et al. | 242/194 |
| 3,920,197 | 11/1975 | Tucker | 242/194 |
| 3,920,198 | 11/1975 | Sutliff | 242/194 |
| 4,210,296 | 7/1980 | Frechette | |
| 4,226,454 | 10/1980 | Tranberg et al. | 70/380 X |
| 4,351,497 | 9/1982 | Kiessling et al. | 242/194 |
| 4,413,919 | 11/1983 | Applegate et al. | 242/194 X |
| 4,756,418 | 7/1988 | Johanson et al. | |
| 4,802,633 | 2/1989 | Beery | |
| 4,830,305 | 5/1989 | Güggi et al. | 354/275 X |
| 4,903,833 | 2/1990 | Beery | 354/275 X |

OTHER PUBLICATIONS

Research Disclosure, Item No. 16352 Nov. 1979.

*Primary Examiner*—Daniel P. Stodola
*Assistant Examiner*—John P. Darling
*Attorney, Agent, or Firm*—Clyde E. Bailey

[57] ABSTRACT

An anti-clockspringing mechanism for a web-roll comprises a unitary lock member having a cylindrical body rotatably mounted in a sidewall of the cartridge. A flange on a web-spool on which the web-roll is wound is provided with an annular lip having alternately spaced lugs and notches. The body has a handle on one side thereof extending toward the exterior of the cartridge, and a lock member on the opposite side of the body extending into the interior cavity of the cartridge. The lock member is in alignment with a sector of the annular lip and lies in the plane of the annular lip. The lock member further comprises at least one shoulder projecting from the opposite side of the body. The lock member is moveable between an unlocked position, in which the shoulder is withdrawn from a lip notch and is out of alignment with the lip lugs for allowing the web-spool to freely rotate, and a locked position in which the shoulder is in alignment with the lip and nests within a lip notch in a position transverse to the lip lugs for preventing or blocking the web-spool from rotating.

7 Claims, 9 Drawing Sheets

WEB-ROLL ANTI-CLOCKSPRINGING MECHANISM

BACKGROUND OF THE INVENTION

1. Field of the Invention

The present invention relates generally to web-roll cartridges, and more particularly to an anti-clockspringing mechanism for preventing a wound roll of web material on a web-spool within a cartridge from clockspringing during storage, handling, and shipment thereof.

2. Description of the Prior Art

In various packages or cartridges now in use for webs of photographic film and paper, the web is wound on a spool or core, with or without flanges, and is disposed within the cartridge which totally surrounds or encloses the web and protects it from light and other damaging effects. One end of the web is normally secured to the core or spool center, and the other end extends out of the cartridge through a slot therein. The other end is fastened to the exterior surface of the cartridge and is released therefrom for insertion into a camera or the like. It has been found that there is a tendency for the web in such cartridges to unwind during storage, handling and shipping. Inasmuch as the inner end of the web is connected to the core or the spool center and the outer end is normally secured to the outer surface of the cartridge, the web acts as a released clockspring, turning the spool as it unwinds. Such clockspringing can result in scratching or abrading the surface of adjacent web convolutions causing a deterioration in the quality of the image that may be recorded thereon. In other instances, the web can clockspring outwardly to the extent that the outer convolution of web jams against the inner surface of the cartridge making subsequent unreeling of the web difficult or impossible. In situations in which the outer end of the web is not fastened to the outer surface of the cartridge, or is inadvertently released from the cartridge surface, the clockspringing can cause the outer end of the web to be pulled back through the slot into the cartridge interior cavity, resulting in a cartridge that is completely unusable.

Various attempts have been made to provide anti-clockspringing apparatus for preventing unwinding of the web in cartridges. For example, an anti-clockspringing device for a film cartridge is disclosed in U.S. Pat. No. 3,613,876, which issued to Kohler et al. on Oct. 19, 1971. In the disclosed film cartridge, one or more spot welds is provided between the surface of the core and the cartridge hub. The spot weld has sufficient strength to prevent the core from rotating during shipping, but will break as the film is withdrawn from the cartridge, permitting the core to rotate. In U.S. Pat. No. 3,784,001, which issued to Bushnell et al. on Jan. 8, 1974, a film cartridge is disclosed in which clockspringing of a roll of film is prevented by providing a frangible connector between the core and a portion of the cartridge. The connector has sufficient strength to prevent the core from rotating during shipping, but which will break as the film is withdrawn from the cartridge, permitting the core to rotate. A core-locking device for a web dispensing cassette is disclosed and published as Item No. 16352 in the November 1977 issue of *Research Disclosure*. In that core-locking device, a web-winding core is provided with a slotted end, and a core-locking member is provided that is captive and slidable (but yet light-tight) in one of two end caps of the cassette. In U.S. Pat. No. 4,210,296, which issued to Frechette on Jul. 1, 1980, a ribbon cartridge with an integral anti-spool rotation device is disclosed. The anti-spool rotation device comprises an axially movable spool core insert connected to the cartridge wall by flexible bridges or arms. The core insert is manually pressed into the open end of the core to frictionally hold the core against rotation. Upon mounting the cartridge in a machine, a post thereon will axially push the core insert out of frictional engagement with the spool core, thereby allowing free rotation of the web supply spool. It is also known in the prior art to prevent clockspringing of a wound roll of web material within a cartridge by providing aligned notches in outer surfaces of the core end and cartridge wall and placing a rubber band around the entire cartridge with the band nesting in the notches. In still another prior-art reference, U.S. Pat. No. 4,756,418, which issued to Johanson et al. on Jul. 12, 1988, prevention of clockspringing of a wound roll of web material within a cartridge is achieved by providing a notch in a core end alignable with an enclosed slot in a wall of the cartridge, and inserting a clip through the aligned notch and slot. In U.S. Pat. No. 4,802,633, which issued to Beery on Feb. 7, 1989, an anti-clock-springing mechanism is disclosed comprising a ring gear on the flange of the web-spool engageable by a "one-shot" bendable locking gear sector on the cartridge body. The gear sector is normally in engagement with the ring gear to prevent the web-spool from rotating and the web material thereon from clockspringing during shipment and storage of the cartridge. An operating pin is insertable through a light-tight opening in the cartridge for engaging the gear sector and disengaging it from the ring gear to allow web-spool rotation.

Although the aforementioned prior-art attempts at solving the problems of web-roll clockspringing in cartridges have had varying degrees of success, the need still exists for an improved anti-clockspringing mechanism that is of simple design and construction, reliable in operation, and economical to manufacture. An object of the present invention is to fulfill this need.

SUMMARY OF THE INVENTION

An object of the present invention is to provide an improved anti-clockspringing mechanism for a web-roll cartridge. The anti-clockspringing mechanism comprises a web-spool having a core onto which a web is wound to form a web-roll. A flange having an annular lip provided with angularly spaced alternating lugs and notches is attached to each end of the core. A cartridge encloses and rotatably supports the web-spool with a sidewall of the cartridge facing a flange in closely spaced relation. An anti-clockspringing lock member is rotatably mounted in the sidewall, and is provided with at least one shoulder facing a sector of the circular lip. The lock member is rotatably moveable in the cartridge between unlocked and locked positions. In the unlocked position, the shoulder is withdrawn from a lip notch and is out of alignment with the lip lugs, allowing the flange and web-roll to freely rotate. In the locked position, the lock member shoulder nests within a lip notch in a position in alignment with and transverse to the lip lugs for preventing the flange and web-roll from rotating.

Some advantages of the anti-clockspringing mechanism of this invention are (1) a reduction in the web-roll inertial forces on the core and possible damage thereto during storage, handling, and shipping, (2) simplicity of design and construction, (3) reuseability of the cartridge and anti-clockspringing mechanism, (4) reliability of operation, and (5) manufacturing economy.

The invention and its objects and advantages will become more apparent from the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because certain parts of web-spools, web-rolls, and cartridges are well-known, the following description is directed in particular to those elements forming, cooperating directly with, or relating to the present invention. Elements not specifically shown or described herein are selectable from those known in the art.

Figure 1:
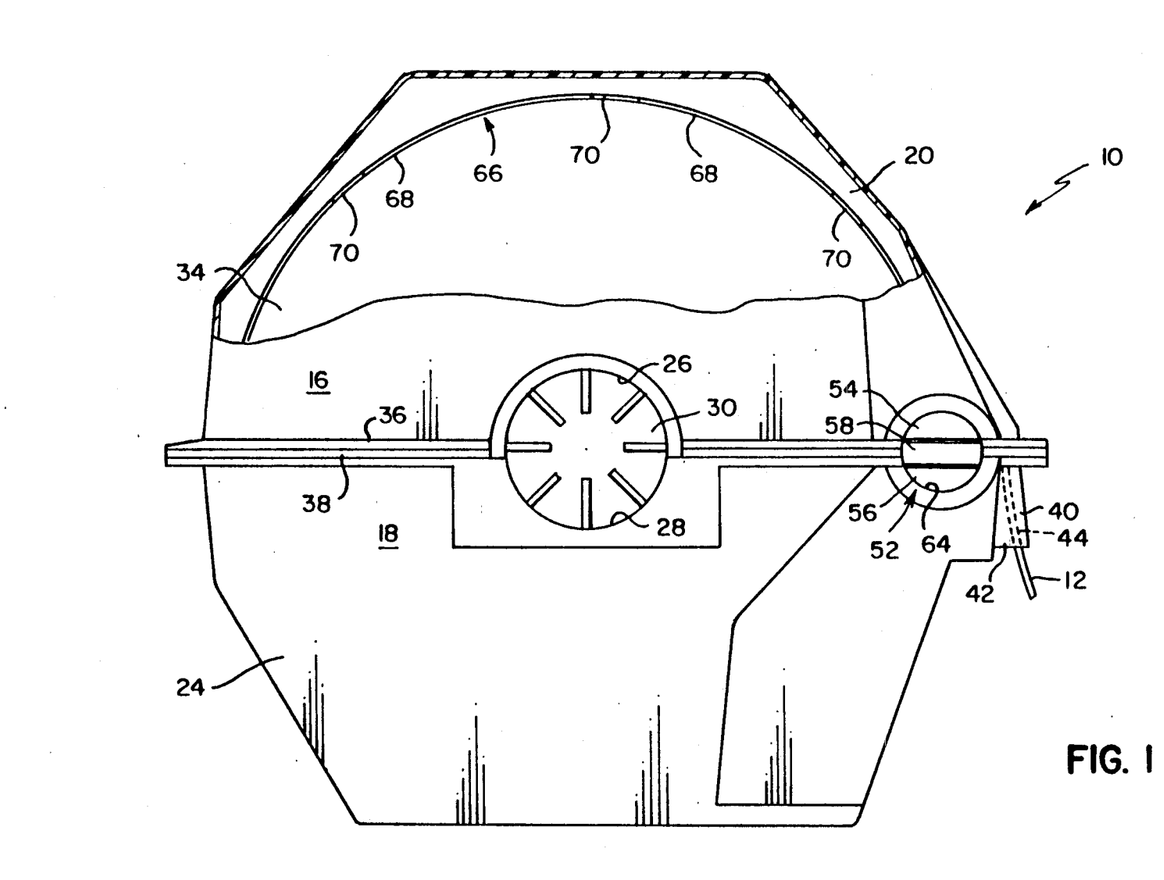
FIG. 1 is a side elevational view of a cartridge in which a preferred embodiment of the web-roll anti-clockspringing mechanism of this invention is embodied, with a portion thereof broken away to show a portion of the web-spool flange.
Figure 2:
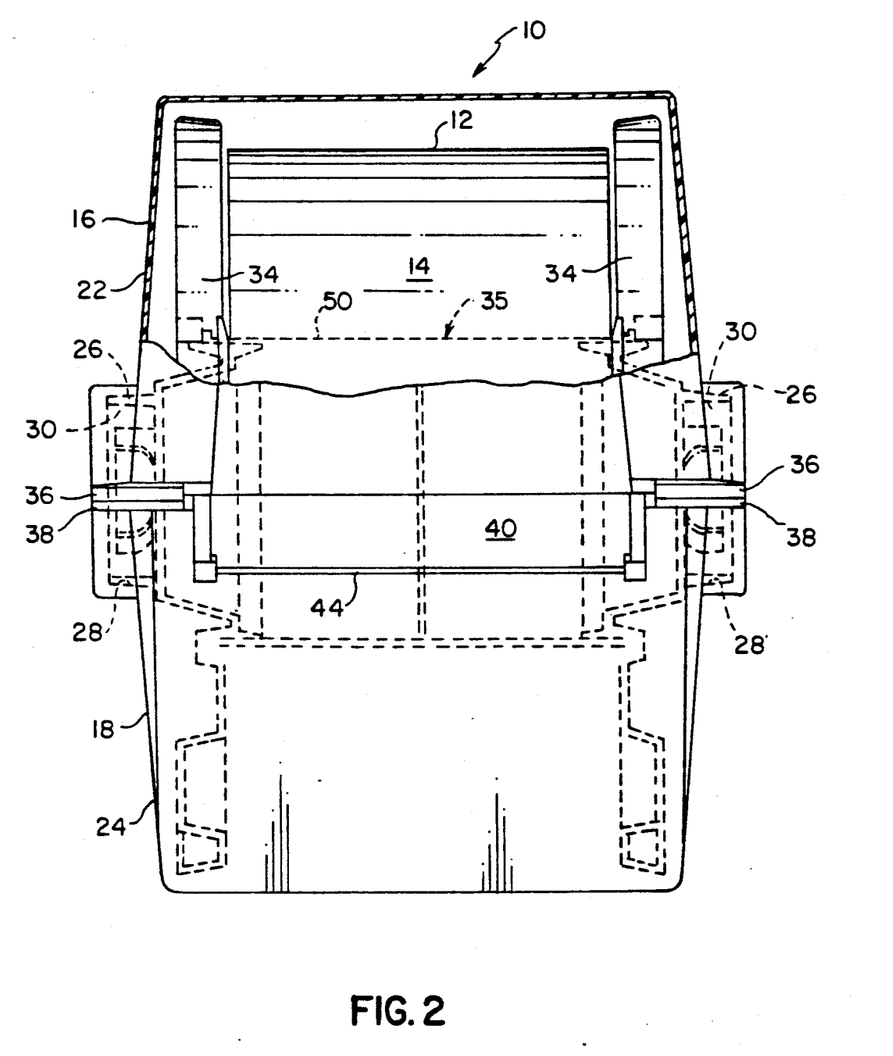
FIG. 2 is an end elevational view of the cartridge with a portion thereof broken away to expose a portion of the web-spool and web-roll.

Illustrated in FIGS. 1 and 2 is a cartridge 10 of a type suitable for supplying a computer output microfilmer or the like, not shown, with a long web 12 of 16 mm and/or 105 mm wide films from a web-roll 14. The cartridge typically comprises a pair of upper and lower cartridge housings 16, 18 defining a central interior cavity 20 and having sidewalls 22, 24 provided with matching semi-cylindrical recesses forming bearings 26, 28 for rotatably supporting cylindrical journals 30 on a pair of flanges 34 of a web-spool 35 mounted within the cavity. The cartridge housings 16, 18 are sealed together along mating rim surfaces 36, 38 for enclosing the web-roll 14 on web-spool 35. Housings 16, 18 have nose portions 40, 42 with opposed inner surfaces defining an exit slot 44 through which the web 12 is withdrawn from the cartridge. The opposed inner surfaces normally have a plush or foam material, not shown, applied thereto to prevent light from entering the cartridge interior cavity 20.

With further reference to FIG. 2, the web-spool 35 comprises a core 50 shown, dotted, onto which the long web 12 of film or paper is wound, forming the web-roll 14. The web-spool further comprises the aforementioned pair of flanges 34 which are attached to ends of the core 50 to prevent dishing and/or telescoping of the web-roll.

Referring to FIGS. 1 and 3-6, a preferred embodiment of the web-roll anti-clockspringing mechanism of this invention comprises a unitary lock member 52 (FIGS. 3 and 6) having a thin cylindrical body 54. The body has an outer flat surface 56 from which a handle portion 58 extends laterally outwardly. The body 54 further has an inner, substantially flat surface 60 from which an arcuate eccentric lock shoulder 62 extends laterally outwardly.

Figure 3:
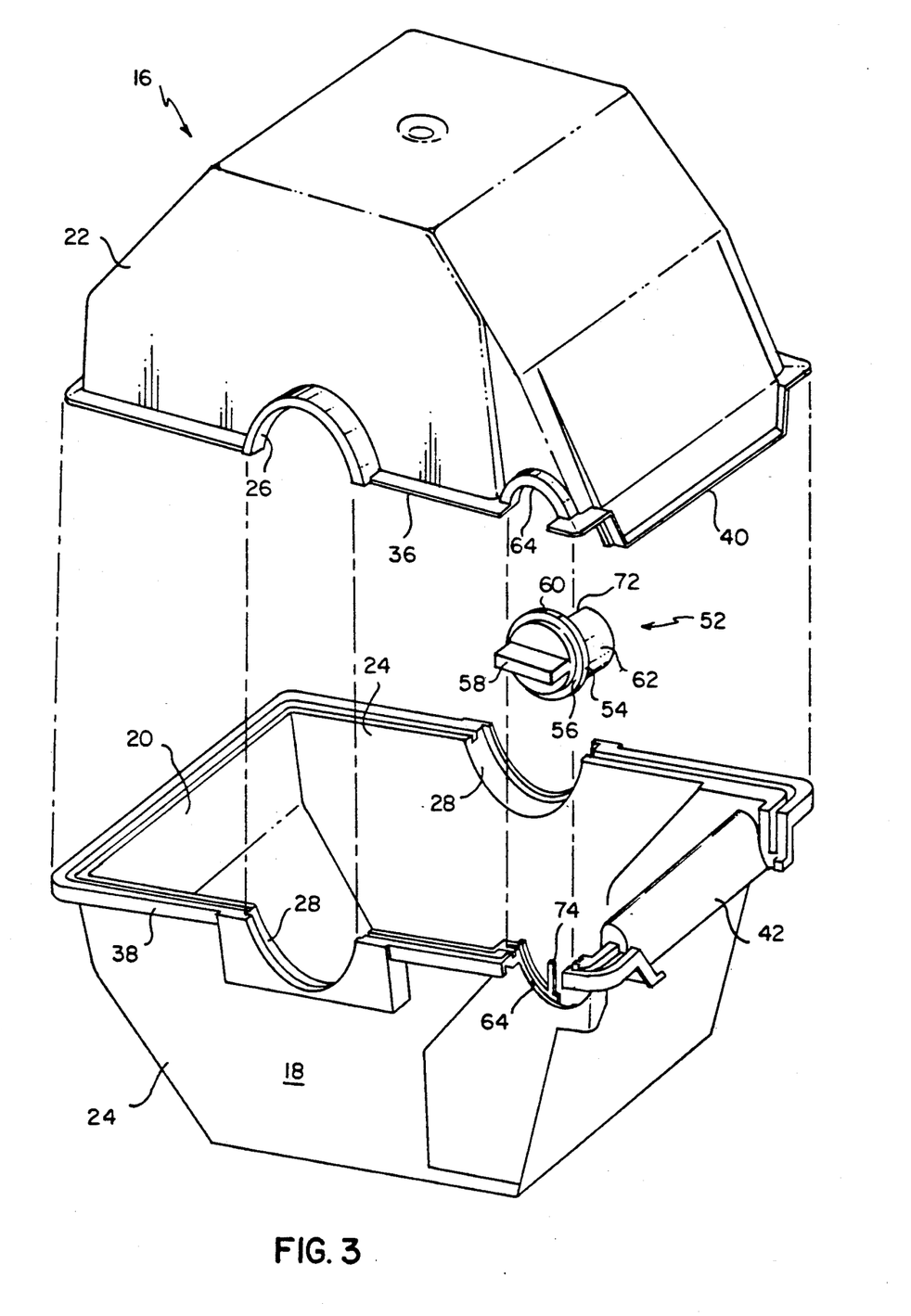
FIG. 3 is an exploded view, in perspective, of the cartridge and anti-clockspringing lock member, with the web-spool omitted for clarity.
Figure 4:
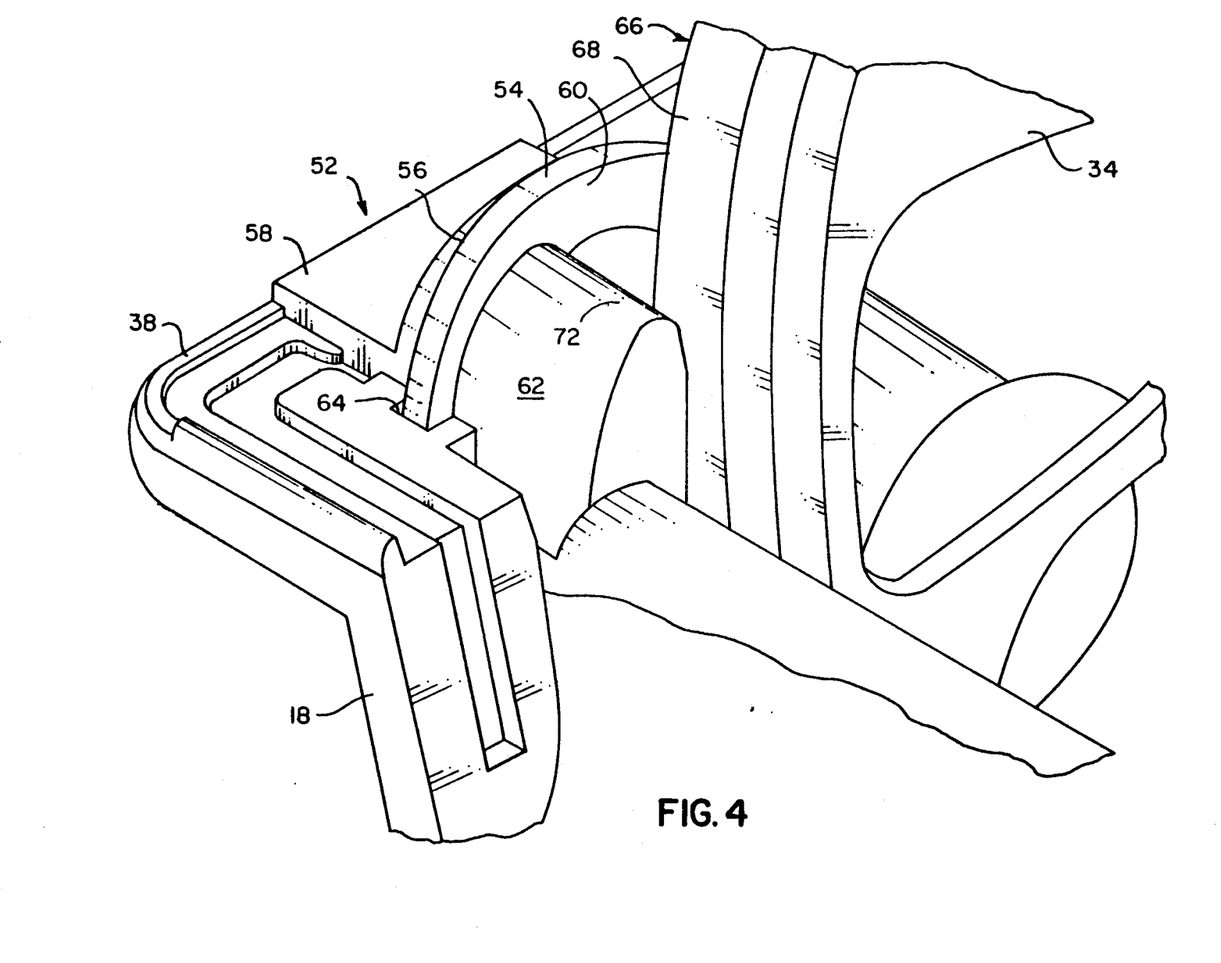
FIG. 4 is a segmental, enlarged, perspective view of a lower portion of the cartridge housing, showing the web-roll anti-clockspringing lock member of FIGS. 1 and 3 in its unlocked position.
Figure 5:
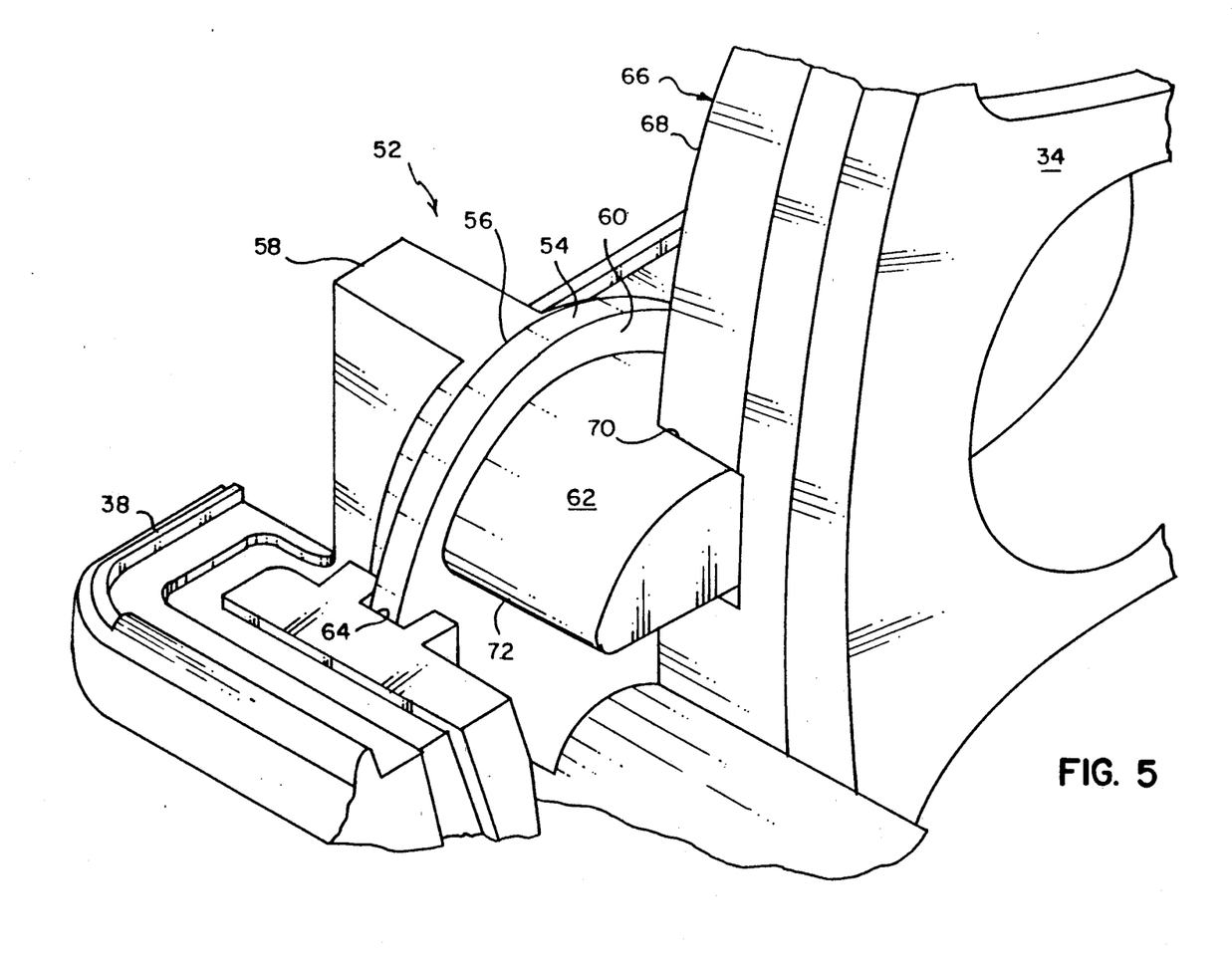
FIG. 5 is a segmental, enlarged, perspective view similar to FIG. 4, showing the web-roll anti-clockspringing lock member of FIGS. 1 and 3 in its locked position.
Figure 6:
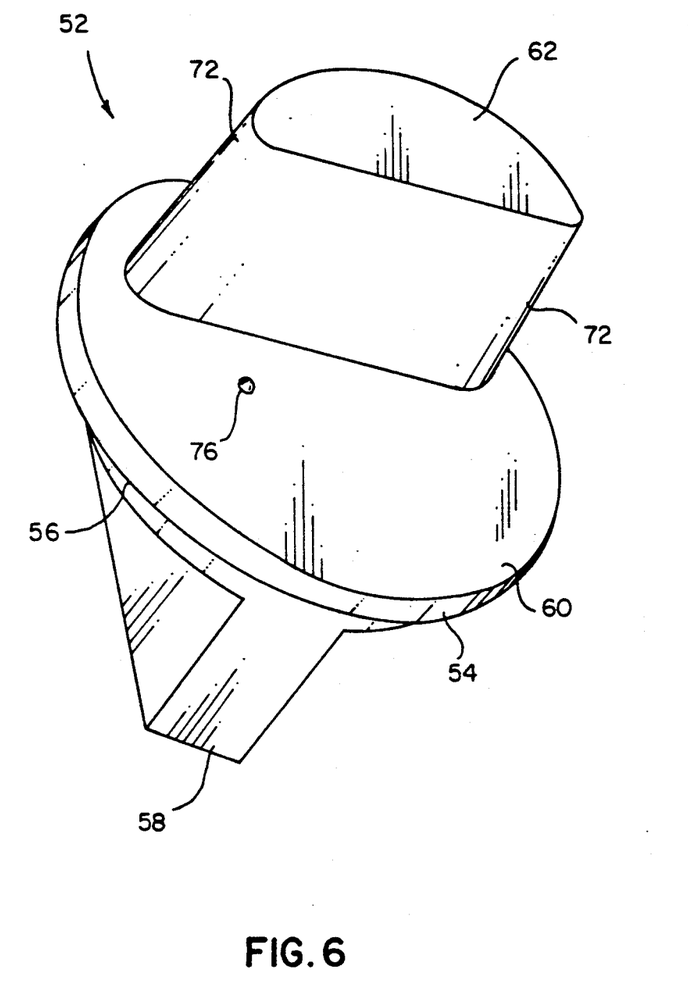
FIG. 6 is a segmental, enlarged, rear perspective view of the web-roll anti-clockspringing lock member.

With further reference to FIGS. 3-5, the web-roll anti-clockspringing lock member 52 is rotatably mounted in sidewalls 22, 24 of the cartridge 10 by nesting the periphery of the body 54 within matching semi-cylindrical grooved bearings 64 in the sidewalls 22, 24. The grooves in the bearings cooperate with body 54 to provide a light-seal to prevent light from entering the cartridge cavity 20. In this mounted position, the handle portion 58 is accessible from the exterior of the cartridge, and the eccentric lock shoulder 62 faces a sector of an annular lip 66 on the periphery of a flange 34. The lip is provided with angularly spaced alternate lugs 68 and notches 70 in substantial alignment with the lock shoulder 62 and all lying in substantially the same plane. The edges 72 of the lock shoulder 62 are rounded to facilitate movement of the shoulder into a nesting position within a notch 70 upon rotatable movement of the lock member 52 to its locked position, as best seen in FIG. 5. In this locked position, the lock shoulder 62 is positioned transverse to the lugs 68 and blocks the flange 34 and web-roll 14 from rotating. When the lock member 52 is rotatably moved to its unlocked position, as best seen in FIGS. 1 and 4, the eccentric lock shoulder 62 is moved out of or withdrawn from a lip notch 70, and the inner surface thereof is substantially parallel to and spaced from the lip 66, allowing the flange 34 and web-roll 14 to freely rotate.

Detent means may be interposed between the lock member 52 and cartridge 10 for releasably holding the lock member in its locked or unlocked position. The detent means comprises a flexible finger 74 extending radially outwardly from a sidewall bearing 64, as best seen in FIG. 3, cooperating with a nipple 76 (FIG. 6) on the inner flat surface 60 of the lock member 52. In the locked position, the nipple 76 is adjacent to one side of the finger 74, and is adjacent to the other side of the finger when the lock member is moved to its unlocked position.

Figure 7:
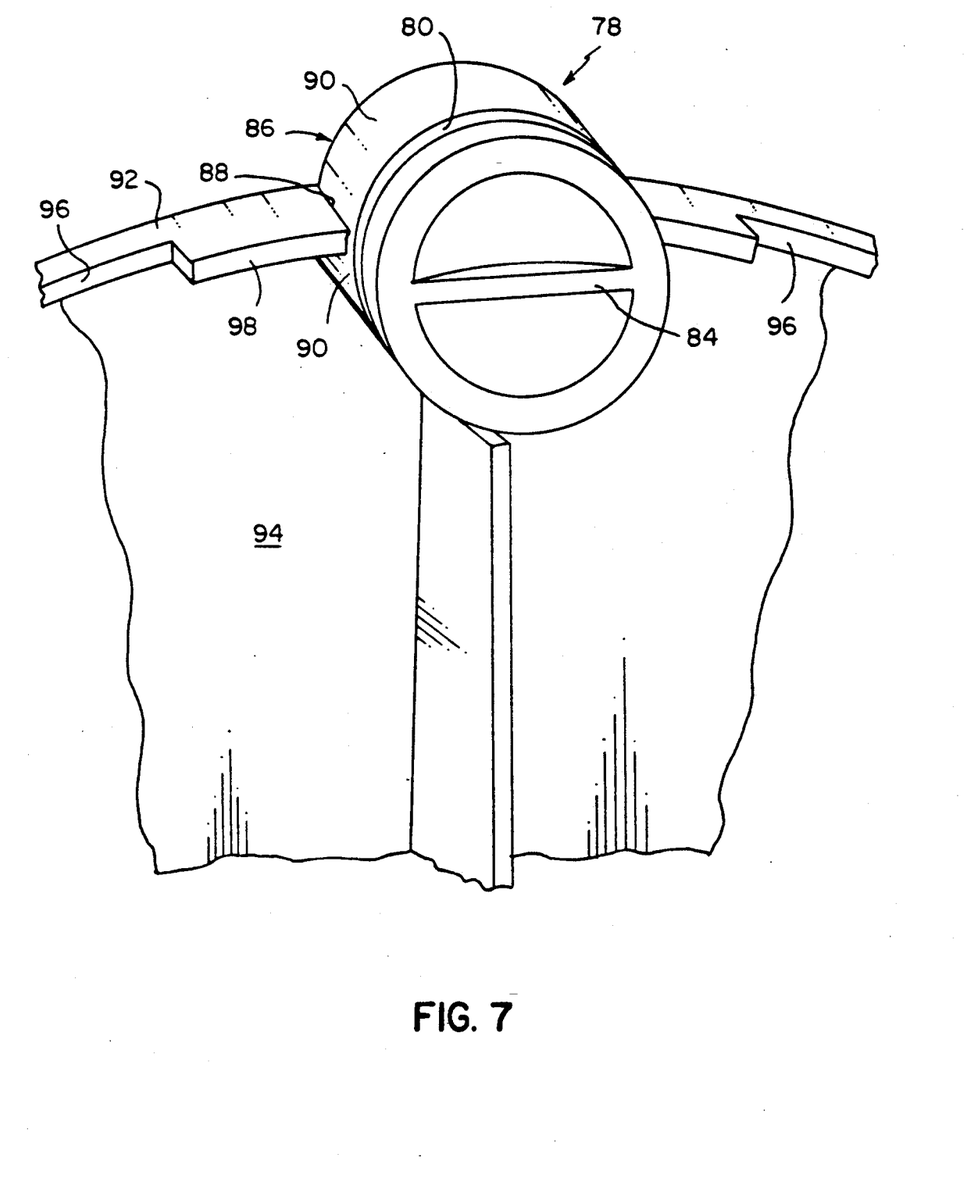
FIG. 7 is a segmental, front perspective view of another preferred embodiment of the web-roll anti-clockspringing mechanism of this invention, with the lock member in its unlocked position.
Figure 8:
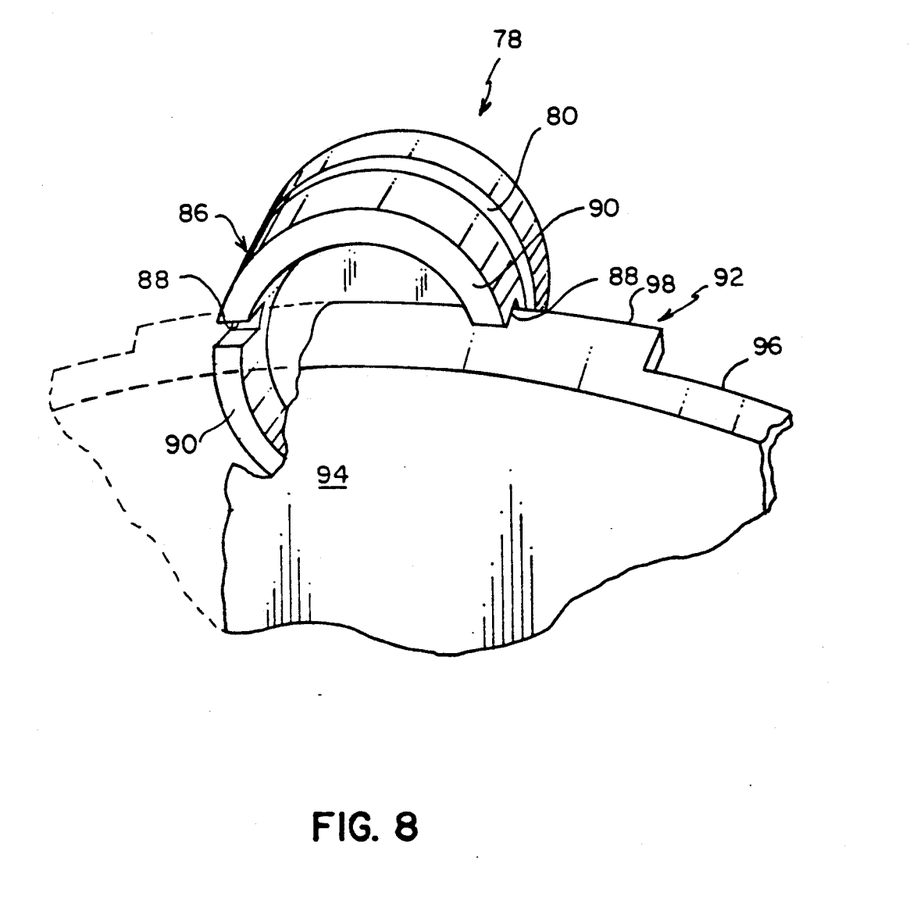
FIG. 8 is a segmental, rear perspective view of the lock member of FIG. 7.
Figure 9:
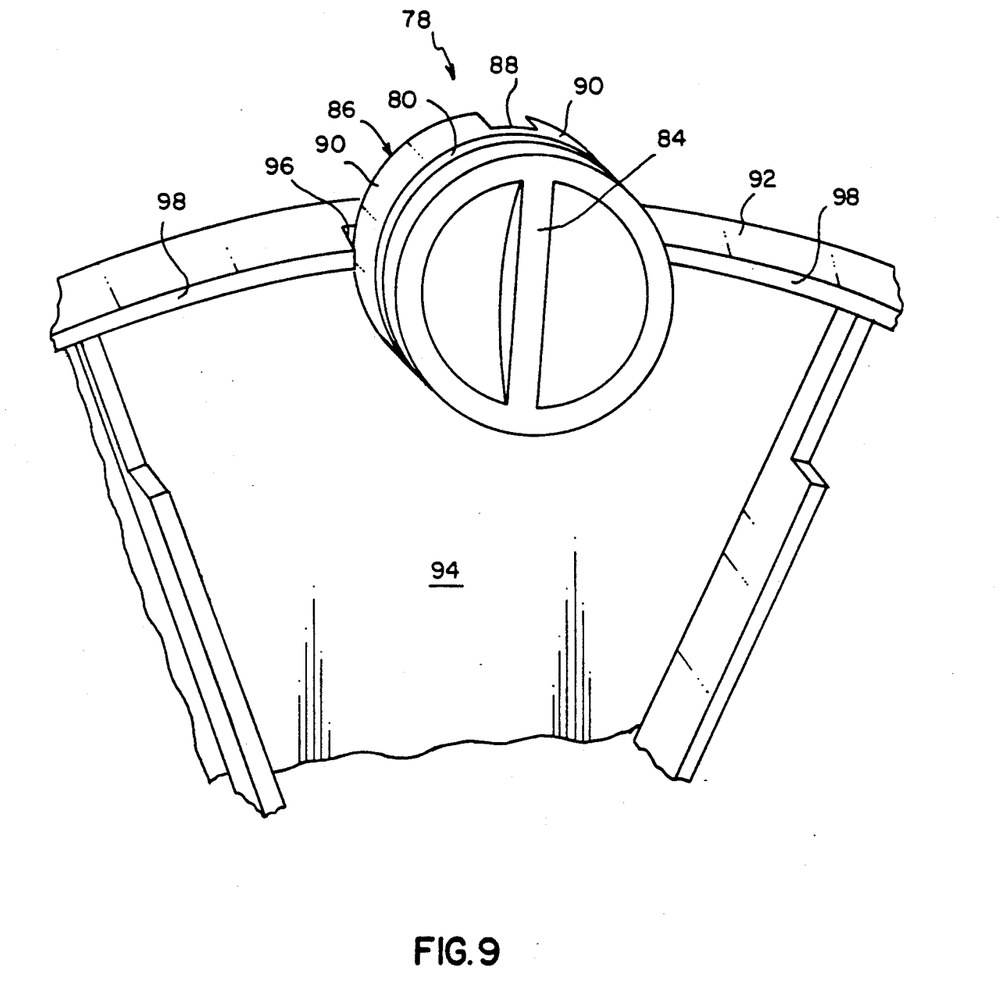
FIG. 9 is a segmental, front perspective view similar to FIG. 7, showing the lock member in its locked position.

With reference to FIGS. 7-9, another preferred embodiment of the web-roll anti-clockspringing mechanism of this invention is disclosed, comprising a unitary cylindrical lock member 78 having a peripheral groove 80 for receiving semi-cylindrical bearing surfaces, not shown, in sidewalls of the housings at the juncture thereof. The lock member 78 has a handle 84 on one side facing the exterior side of the cartridge and a lock means on the opposite side extending into the cartridge interior cavity. The lock means comprises an annular, laterally extending rim 86 having a pair of diametrically opposed rim notches 88 forming a pair of diametrically opposed arcuate lock shoulder 90. When the lock member 78 is moved by the handle 84 to an unlocked position, as seen in FIGS. 7 and 8, the rim notches 88 are in alignment with a flange lip 92, allowing the lip, flange 94, and web-roll 14 to freely rotate. When the lock member 78 is moved to its locked position, as seen in FIG. 9, the lock shoulder 90 nest within an elongated lip notch 96 in a position transverse to the lip lugs 98 for blocking and preventing the flange 94 and web-roll 14 from rotating.

The invention has been described in detail with particular reference to preferred embodiments thereof, but it will be understood that variations and modifications can be effected within the spirit and scope of the invention.

We claim:

1. A web-roll anti-clockspringing mechanism comprising:
    a web-spool onto which a web-roll is wound;
    a flange on the web-spool having an annular lip provided with angularly spaced alternate lugs and notches;
    a cartridge enclosing and rotatably supporting the web-spool, the cartridge having a sidewall facing the flange in closely spaced relation; and
    an anti-clockspringing lock member rotatably mounted in the sidewall and facing a sector of the annular lip, the lock member further having an eccentric shoulder lying substantially in the plane of the lip, the lock member further adapted to be moveable between a locked position, in which the lock shoulder nests in a lip notch and is transverse to the lugs to prevent the flange and web-spool from rotating, and an unlocked position in which the lock shoulder is withdrawn from a lip notch, allowing the flange and web-spool to freely rotate.

2. A web-roll anti-clockspringing mechanism according to claim 1 wherein the annular lip is on the periphery of the flange, and extends axially outwardly from the flange.

3. A web-roll anti-clockspringing mechanism according to claim 2 wherein the lock member has a pair of axially extending shoulders defining a notch therebetween.

4. A web-roll anti-clockspringing mechanism according to claim 3 wherein the lock member comprises a unitary member having a cylindrical body rotatably mounted in a bearing in the sidewall of the cartridge, wherein the pair of shoulders are positioned in diametrically opposed relation on the one side of the body, and the lock member further has a handle on the opposite side of the body.

5. A web-roll anti-clockspringing mechanism according to claim 1 wherein the lock shoulder extends axially inwardly toward the flange and has an outer arcuate surface.

6. A web-roll anti-clockspringing mechanism according to claim 1 wherein the lock member comprises a unitary member having a cylindrical body rotatably mounted in an opening in the sidewall of the cartridge, the lock shoulder is mounted on one side of the body and the lock member further has a handle on the opposite side of the body.

7. A web-roll anti-clockspringing mechanism according to claim 6 wherein the annular lip is on the periphery of the flange and extends axially outwardly from the flange, and wherein the lock shoulder extends axially inwardly toward the flange and has an outer arcuate surface.

* * * * *